(12) United States Patent
Zheng et al.

(10) Patent No.: US 7,653,611 B2
(45) Date of Patent: Jan. 26, 2010

(54) DIAGNOSTIC REPORT IMPROVEMENT UTILIZING UNOBTRUSIVE WORKFLOW LOGGING

(75) Inventors: Zijian Zheng, Bellevue, WA (US); Mark B. Mydland, Bothell, WA (US); Pyungchul Kim, Sammamish, WA (US); Nancy E. Jacobs, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 432 days.

(21) Appl. No.: 11/093,546

(22) Filed: Mar. 30, 2005

(65) Prior Publication Data

US 2006/0241908 A1 Oct. 26, 2006

(51) Int. Cl.
*G06F 17/30* (2006.01)
(52) U.S. Cl. ............................ 707/1; 707/2; 715/200
(58) Field of Classification Search ........................ None
See application file for complete search history.

(56) References Cited

U.S. PATENT DOCUMENTS

| | | | | |
|---|---|---|---|---|
| 5,307,262 A * | 4/1994 | Ertel | ............................ | 705/2 |
| 5,537,590 A * | 7/1996 | Amado | ............................ | 707/2 |
| 5,701,400 A * | 12/1997 | Amado | ............................ | 706/45 |
| 6,434,572 B2 * | 8/2002 | Derzay et al. | ............ | 707/104.1 |
| 6,509,914 B1 * | 1/2003 | Babula et al. | ............... | 715/762 |
| 6,553,372 B1 * | 4/2003 | Brassell et al. | ................. | 707/5 |
| 6,598,011 B1 * | 7/2003 | Howards Koritzinsky et al. | | 702/185 |
| 6,643,639 B2 * | 11/2003 | Biebesheimer et al. | ......... | 707/3 |
| 6,832,199 B1 * | 12/2004 | Kucek et al. | .................... | 705/2 |
| 6,936,476 B1 * | 8/2005 | Anderson et al. | ........... | 436/518 |
| 7,007,074 B2 * | 2/2006 | Radwin | ...................... | 709/217 |
| 7,255,406 B1 * | 8/2007 | Huck et al. | .................... | 299/95 |
| 7,263,710 B1 * | 8/2007 | Hummel et al. | ............... | 725/86 |
| 2003/0055321 A1 * | 3/2003 | Watrous et al. | ............ | 600/300 |
| 2003/0061071 A1 * | 3/2003 | Babula et al. | .................. | 705/2 |
| 2004/0199332 A1 * | 10/2004 | Iliff | ............................ | 702/19 |
| 2005/0086195 A1 * | 4/2005 | Tan et al. | ....................... | 707/1 |
| 2005/0125390 A1 * | 6/2005 | Hurst-Hiller et al. | ........... | 707/3 |
| 2005/0222901 A1 * | 10/2005 | Agarwal et al. | ............... | 705/14 |
| 2005/0222981 A1 * | 10/2005 | Lawrence et al. | .............. | 707/3 |

* cited by examiner

*Primary Examiner*—John R. Cottingham
*Assistant Examiner*—Noosha Arjomandi
(74) *Attorney, Agent, or Firm*—Merchant & Gould P.C.

(57) ABSTRACT

The subject invention leverages data logging of responses to diagnostic reports to provide data that can be mined for diagnostic report quality information. Instances of the subject invention provide an initial diagnostic report assessment means to facilitate review by an entity. The entity's responses to the sorted diagnostic reports are logged unobtrusively to create diagnostic report quality data. This data is then analyzed by an analysis means that can then adjust the assessment means to improve its performance. In this manner, the performance of the assessment means is increased while reducing the workload of the entity reviewing the diagnostic reports. Other instances of the subject invention facilitate to increase the performance of a diagnostic report generating means as well. Instances of the subject invention can also employ machine learning techniques to facilitate in analyzing the quality data and/or in assessing the diagnostic reports.

20 Claims, 7 Drawing Sheets

DIAGNOSTIC REPORT IMPROVEMENT UTILIZING UNOBTRUSIVE WORKFLOW LOGGING

TECHNICAL FIELD

The subject invention relates generally to data mining, and more particularly to systems and methods for utilizing unobtrusive logging of an entity's response to diagnostic reports to facilitate in improving diagnostic reports.

BACKGROUND OF THE INVENTION

Computers have become an integral part of society. Every day people become more dependent on this technology to facilitate both work and also leisure activities. They typically consist of "hardware" and "software." The hardware is the physical components of the computer while the software constitutes "programs" that are run on the computer. Examples of some common programs include word processors, spreadsheets, and email programs. In general, a user can typically use these programs to some extent. Basic features might be intuitive and require little training to use. However, at some point, the user of the program will run into a task that they are unable to complete without help. Rather than provide a "live" operator to answer questions, most software programs include an "assistant" that helps the user when they become stuck on a problem. General forms of an assistant include help indexes with search support, common problems encountered, and/or user specific solutions and the like.

An effective way of building the assisting program is using a platform commonly known as an "assistant platform." The assistant platform or "AP" typically provides a user interface that allows the user to look up answers and/or actually pose questions so that the AP can provide an answer. During these user queries, data is collected by the AP as to the adequacy and/or relevancy and the like of the AP response to a user's query. This information is then analyzed, compiled, and generated into diagnostic reports that contain one or more suggestions for improving the AP. The AP typically has a search authoring tool user interface that allows an author of the software program to retrieve the diagnostic reports. The author desires to improve the AP so that a user will become more satisfied with it and not become frustrated by unhelpful suggestions to a problem. Thus, the author reviews the diagnostic reports and their suggestions. It is possible that the author may encounter several hundred or even thousand diagnostic reports for a popular program utilized by many users. The author typically must sort through the list of reports and determine which reports are worth reviewing and taking actions on. This is a very time consuming task and is often accomplished using a computing device so that the author can remark each suggestion.

It is easily imaginable that if the diagnostic list is extremely long, that some reports will not be reviewed and that insignificant suggestions or incorrect suggestions might be reviewed in detail before they are properly assessed, substantially reducing the author's productivity and performance. The difficulty of the reviewing process is further compounded by the fact that in some situations the proper content existed in the AP, but the user's intent was misinterpreted, while in other situations, the user's intent was properly assessed but the correct information was not available to the AP. Thus, different situations can require different solutions to resolve. For these reasons, difficult and time consuming situations may be put aside until the easier suggestions are implemented first. Therefore, the author's workload is dictating priority rather than a true priority based on the significance of the suggestions provided by the AP.

The result of large quantities of suggestions and complex user intent problems is a poorly improved AP. This causes an increase in user dissatisfaction with the software product, possibly generating even more diagnostic reports and/or decreasing sales of the software product itself. Unfortunately, this is a typical scenario for many APs and their authors. Similar problems can also occur with non-typical software programs as well. For example, it is common today to find computers and software in automobiles as well as other machinery. These types of software can also generate diagnostic reports that need to be reviewed by an author as well. Thus, as programs become even more sophisticated, the need for assistance to the user and/or even to other interfacing devices (e.g., an artificial intelligence device and the like) will only increase as well, burdening reviewing entities even more and greatly decreasing user satisfaction. If a business is dependent on the proper operation of a program, the user's inability to make the program perform effectively could also severely impact business' profits.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates generally to data mining, and more particularly to systems and methods for utilizing an entity's response to diagnostic reports in order to facilitate in improving diagnostic reports. Data logging of responses to diagnostic reports is leveraged to provide data that can be mined for diagnostic report quality information. Instances of the subject invention provide an initial diagnostic report assessment means to facilitate review by an entity. The entity's responses to the sorted diagnostic reports are logged unobtrusively to create diagnostic report quality data. This data is then analyzed by an analysis means that can then adjust the assessment means to improve its performance. Other instances of the subject invention facilitate to increase the performance of a diagnostic report generating means as well. Instances of the subject invention can also employ machine learning techniques to facilitate in analyzing the quality data and/or in assessing the diagnostic reports.

Consequently, instances of the subject invention provide a means to increase performance of diagnostic report assessment models and/or diagnostic report generating systems via analysis of the mined quality information. This allows the workload of an entity charged with reviewing the diagnostic reports to be substantially reduced while performance is increased. Moreover, a user interfacing with an assisting mechanism such as, for example, an assistant platform, can have increased user satisfaction because the entity, such as, for example, an author of a software product, is able to provide a higher performance assisting mechanism with less effort. Thus, instances of the subject invention significantly increase productivity of the entity while simultaneously increasing performance of the assisting mechanism.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
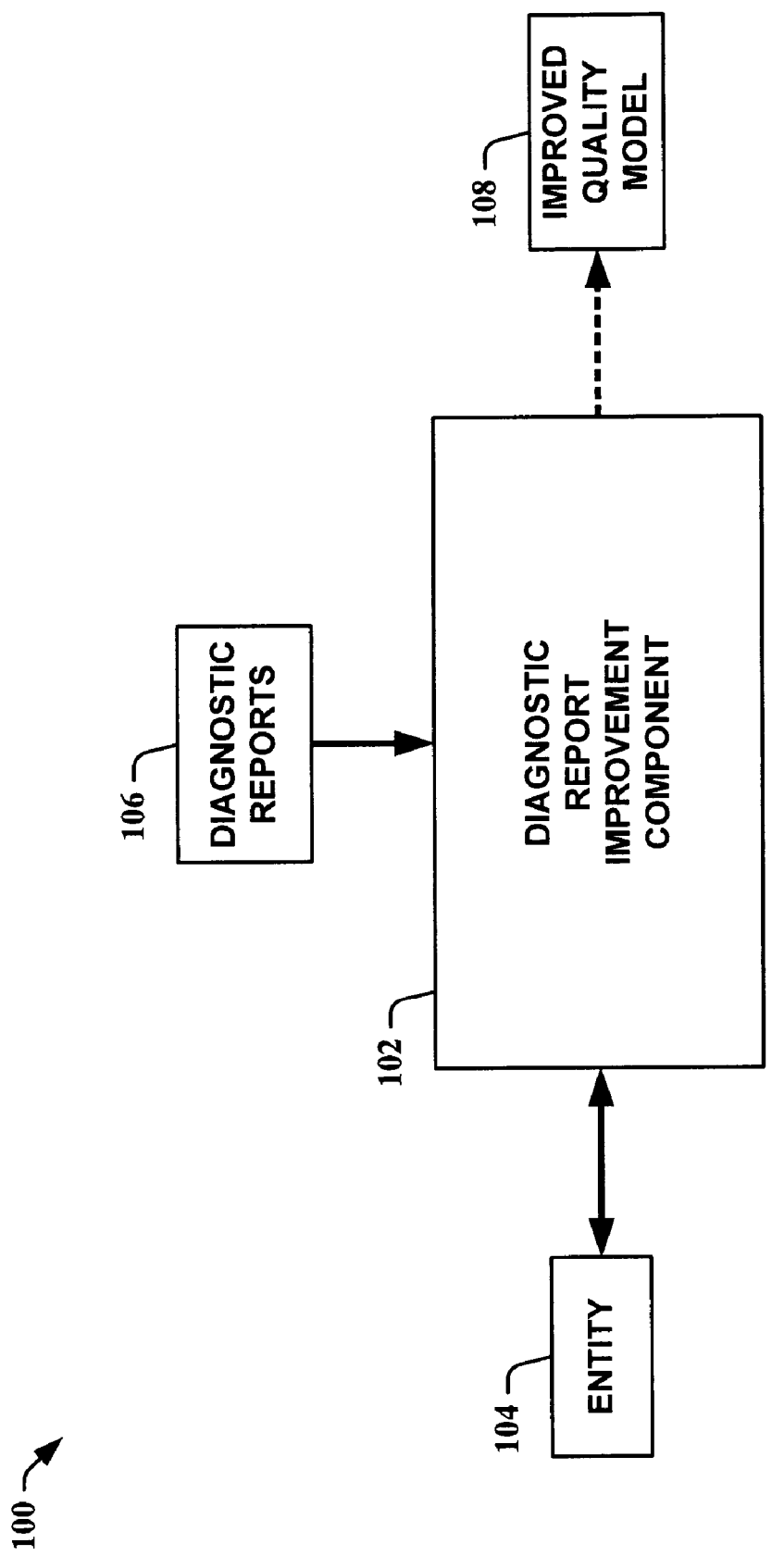
FIG. 1 is a block diagram of a diagnostic report improvement system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Instances of the subject invention provide systems and methods that improve diagnostic techniques. These include, but are not limited to, content and/or search engine diagnostic techniques that provide self improvement. This can be accomplished, for example, by logging authors' usage data with regard to diagnostic reports which facilitate in deriving the authors' feedback on the quality of the reports, and the quality of the internal measurements of a user search such as, for example, user search bundles and intent bundles. Learning models, for example, can then be constructed to predict in what situations the measurements work well and in what situations the measurements do not work well. These models can then be applied to improve the authors' productivity through filtering out low quality reports and/or components. These models can also be utilized to improve the diagnostic technology and systems themselves.

In general, diagnostic reports are generated by an assisting mechanism that facilitates users who seek additional information about an associated product. In one instance of the subject invention, an assistant platform (AP) associated with a software product (e.g., a word processor, accounting software, spreadsheet, etc.) generates diagnostic reports from data obtained from user queries regarding the software product. The diagnostic reports are assessed via criteria such as, for example, highest-to-lowest confidence techniques and the like. The assessment allows an author associated with the software product to address higher priority suggestions from the diagnostic reports first, increasing the author's productivity. As the author interacts with the suggestions, their responses are unobtrusively logged and analyzed to provide improvements in assessing the diagnostic reports. In other instances of the subject invention, improvements can also be made to the assistant platform itself to facilitate in obtaining improved suggestions in the diagnostic reports.

Although instances of the subject invention can be utilized with typical software products, they can also be utilized with specialized type software products in devices other than a common computer. These include, but are not limited to, vehicle diagnostic systems; industrial machinery diagnostic systems; heating, ventilation, and air conditioning (HVAC) diagnostic systems, heavy equipment diagnostic systems, and electronic device diagnostic systems and the like. Thus, for example, instances of the subject invention can be utilized with automobile on-board diagnostic systems to facilitate in improving the diagnostic software that aids a mechanic (i.e., user) in diagnosing automobile problems and the like.

In FIG. 1, a block diagram of a diagnostic report improvement system 100 in accordance with an aspect of the subject invention is shown. The diagnostic report improvement system 100 is comprised of a diagnostic report improvement component 102 that interacts with an entity 104 and receives diagnostic reports 106. The entity 104 can be comprised of, for example, an author of a software product who reviews diagnostic reports to facilitate in improving a software product's assistant platform and the like. As artificial intelligence (AI) becomes more common place, the entity 104 can also include AI systems that review diagnostic reports and the like. The entity 104 can also include non-AI systems that are programmed to provide diagnostic report reviewing as well.

The diagnostic report improvement component 102 assesses the diagnostic reports 106 and interacts with the entity 104 to enhance the entity's work performance and to obtain work product logs associated with suggestions from the diagnostic reports 106. The work product logs are obtained unobtrusively from the interaction between the entity 104 and the diagnostic report improvement component 102. The logs are then analyzed to facilitate in improving the assessment technique utilized when the diagnostic reports 106 are received. In this manner, the productivity of the entity 104 is increased due, in part, to the appropriate priority lists being generated through the assessment process. This allows the most productive diagnostic reports to be reviewed by the entity 104 first, increasing the effectiveness of the entity's diagnostic report reviewing efforts. In other instances of the subject invention, the diagnostic report improvement component 102 can also provide an optional improved quality model 108 that can be utilized to improve diagnostic report generation and the like. The improved quality model 108 can also include a quality report that details the analysis of the logged entity responses in relation to the effectiveness of the diagnostic reports. One skilled in the art can appreciate that in some instances of the subject invention, the assessment process can be initially equivalent to passing the diagnostic reports to the author unchanged to facilitate in providing initial data to improve the diagnostic reports via the diagnostic report improvement component 102. Likewise, the initial diagnostic reports can be directly accessed by the entity 104, bypassing the diagnostic report improvement component 102 altogether.

Figure 2:
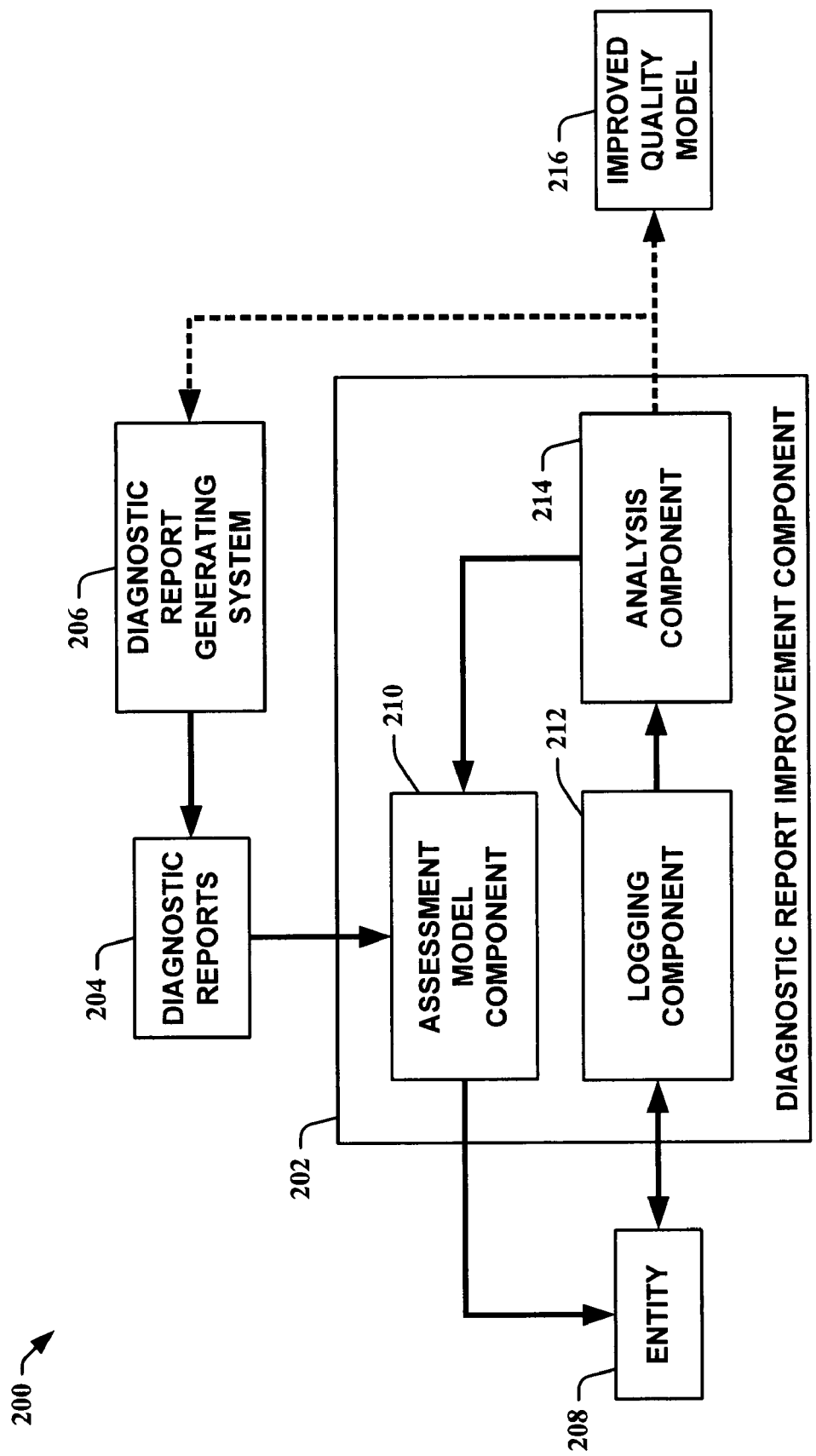
FIG. 2 is another block diagram of a diagnostic report improvement system in accordance with an aspect of the subject invention.

Turning to FIG. 2, another block diagram of a diagnostic report improvement system 200 in accordance with an aspect of the subject invention is depicted. The diagnostic report improvement system 200 is comprised of a diagnostic report improvement component 202 that interacts with an entity 208 and receives diagnostic reports 204 that are generated by a diagnostic report generating system 206. The entity 208 can include human and/or non-human entities as described supra. The diagnostic report generating system 206 can include, but is not limited to, software product assistant platforms and/or other types of diagnostic report generating systems including those detailed supra. The diagnostic report improvement component 202 is comprised of an assessment model component 210, a logging component 212, and an analysis component 214. The assessment model component 210 receives the diagnostic reports 204 and assesses them to facilitate review by the entity 208. The assessment can include confidences associated with each diagnostic report and the like. The entity 208 then reviews the assessed diagnostic reports and its responses are unobtrusively logged by the logging component 212. This data is then analyzed by the analysis component 214 to determine the quality of the diagnostic reports 204 and to facilitate in improving the assessment model component 210.

In other instances of the subject invention, the analysis component 214 facilitates the diagnostic report generating system 206 in improving the diagnostic reports 204 themselves. Thus, the analysis component 214 can interact with the diagnostic report generating system 206 directly and/or via human interaction and the like (e.g., artificial intelligence, etc.). In still other instances of the subject invention, the diagnostic report improvement component 202 can facilitate in improving both the diagnostic reports 204 and also their assessment by the assessment model component 210. The analysis component 214 can also provide an improved quality model 216 that can include a quality report with regard to the helpfulness of the diagnostic report suggestions as determined by the entity 208. The improvements in reporting and/or assessing allow the subject invention to substantially increase the efficiency and productivity of the entity 208. This provides a better assisting mechanism for a device and/or product and typically increases user satisfaction of that assisting mechanism. Users tend to associate all aspects of a device and/or product as a single item so that by increasing the helpfulness of the assisting mechanism, the users have increased satisfaction and productivity with regard to the overall product and/or device as well. This is typically the result of the fact that one purpose of the assisting mechanism is to help a user better utilize the device and/or product.

Figure 3:
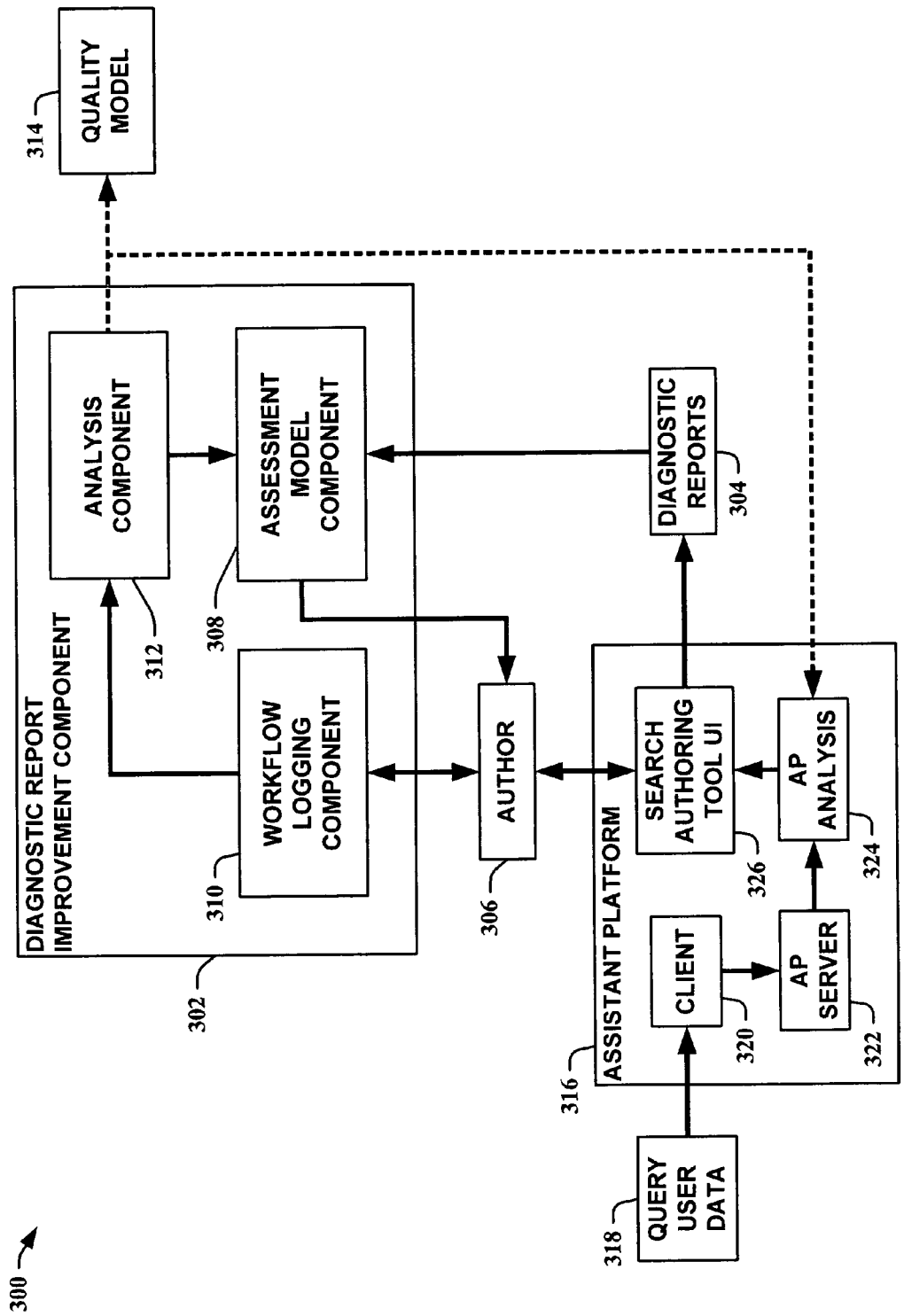
FIG. 3 is yet another block diagram of a diagnostic report improvement system in accordance with an aspect of the subject invention.

Looking at FIG. 3, yet another block diagram of a diagnostic report improvement system 300 in accordance with an aspect of the subject invention is illustrated. The diagnostic report improvement system 300 is comprised of a diagnostic report improvement component 302 that interacts with an author 306 and receives diagnostic reports 304. The diagnostic report improvement component 302 is comprised of an assessment model component 308, a workflow logging component 310, and an analysis component 312. In this example, the author 306 comprises an entity and additionally interacts with an assistant platform (AP) 316. The assistant platform 316 receives query user data 318 and provides the diagnostic reports 304. The assistant platform 316 is comprised of a client 320, an AP server 322, an AP analysis mechanism 324, and a search authoring tool user interface (UI) 326. The workflow logging component 310 can interact with the search authoring tool UI 326 to facilitate author data logging. In other instances of the subject invention, the diagnostic report improvement component 302 can be a plug-in to AP 316.

The AP 316 is typically found with software products to assist a software product user when the user needs additional information to facilitate use of the software product. Thus, a user interacts with the AP 316 and provides query user data 318 that is received by the AP's client 320 which is then relayed to the AP server 322. The AP analysis mechanism 324 then retrieves the data from the AP server 322 and analyzes the query user data 318 to facilitate in providing diagnostic reports. The author 306 can then interact with the search authoring tool UI 326 to request the diagnostic reports 304 based on the query user data 318. The assessment model component 308 then receives the diagnostic reports 304 and assesses an aspect of the diagnostic reports 304 to facilitate the author 306 in reviewing them 304. The aspect can include, but is not limited to, confidences associated with each of the diagnostic reports 304 and the like. The author 306 can then review the assessed diagnostic report list and respond to the diagnostic report suggestions. The workflow logging component 310 logs the author's responses in an unobtrusive manner. The logged data is then analyzed by the analysis component 312 to facilitate in determining the quality of the diagnostic reports 304 and to facilitate in improving the assessment model component 308.

In other instances of the subject invention, the analysis component can also provide a quality model that can, for example, include a quality report with regard to the diagnostic reports 304. In still other instances of the subject invention, the analysis component 312 can also facilitate in improving the AP analysis mechanism 324 of the AP 316. The analysis component 312 can interact with the AP analysis mechanism 324 directly and/or via human interaction and the like (e.g., artificial intelligence, etc.). This allows the AP analysis mechanism 324 to produce a higher quality diagnostic report. Thus, the combination of improving both the generated diagnostic reports and also the assessment of those improved reports provides a substantial improvement in diagnostic report reviewing by the author 306. This greatly increases the efficiency and productivity of the author 306 without interference. Hence, instances of the subject invention can be implemented with existing workflow and AP assisted products without requiring additional training and/or causing workflow impairment.

Consequently, instances of the subject invention can provide improved systems and methods of generating and/or assessing diagnostic reports to improve help systems via data mining techniques that facilitate improvements in, for example, diagnostic report generation for assistant systems. For example, instances of the subject invention can utilize processes to provide improvements for an assistant system of a software product by generating diagnostic reports through analyzing end user usage and/or satisfaction data logs from the assistant system. These reports can present to the authors different types of problems occurring in the assistant system, and suggest corresponding actions to correct the problems. The types of problems can include scenarios such as: a) end users issued a set of similar queries but did not get any satisfied results back from the system, suggesting authors to write new assets related to these queries and b) end users issued a set of similar queries but did not get any satisfied results back directly, however through sequential analysis, the reports suggests relevance assets for authors to map such that after taking these new mappings, the search engine can give relevant results when these queries are issued again later.

Unfortunately, these reports are not always accurate. Thus, the data mining techniques provided by instances of the subject invention can improve the diagnostic report generation. For example, one technique utilizes several processes including data logging. The data logging allows feedback to be gathered from authors on the quality of each diagnostic report. This can be accomplished by building a data log into the authors' work flow. When an author takes the suggested action of a report, the suggestion can be logged, for example, as a good suggestion. Otherwise, when an author discards the suggested action of a report, the suggestion can be logged, for example, as a bad suggestion. However, if the authors take no action, it is typically indeterminate because the authors could have taken no action due to a bad suggestion or taken no action because they desire to review it at a later time. Likewise, a suggestion might not be totally good or totally bad. The author can dislike the suggestion but agree that a problem exists and needs to be fixed in a different manner. The author can also disagree with a problem statement but agree that a fix is needed. In other instances of the subject invention, even a discarded suggestion can be deemed indeterminate. One skilled in the art can appreciate that other variations exist and are within the scope of the subject invention.

The good and bad suggestions mined from the data logs can then be utilized to construct a model to facilitate in predicting what kind of suggestions in diagnostic reports are good and what kinds of suggestions are bad. This model can then be utilized to sort diagnostic reports and suggestions in the reports so that the authors can work on high quality suggestions first. This can significantly increase the authors' productivity. Additionally, the model can be analyzed, for example, to identify in what situations the suggestions are bad such that ways can be found to improve the diagnostic report generation.

Figure 4:
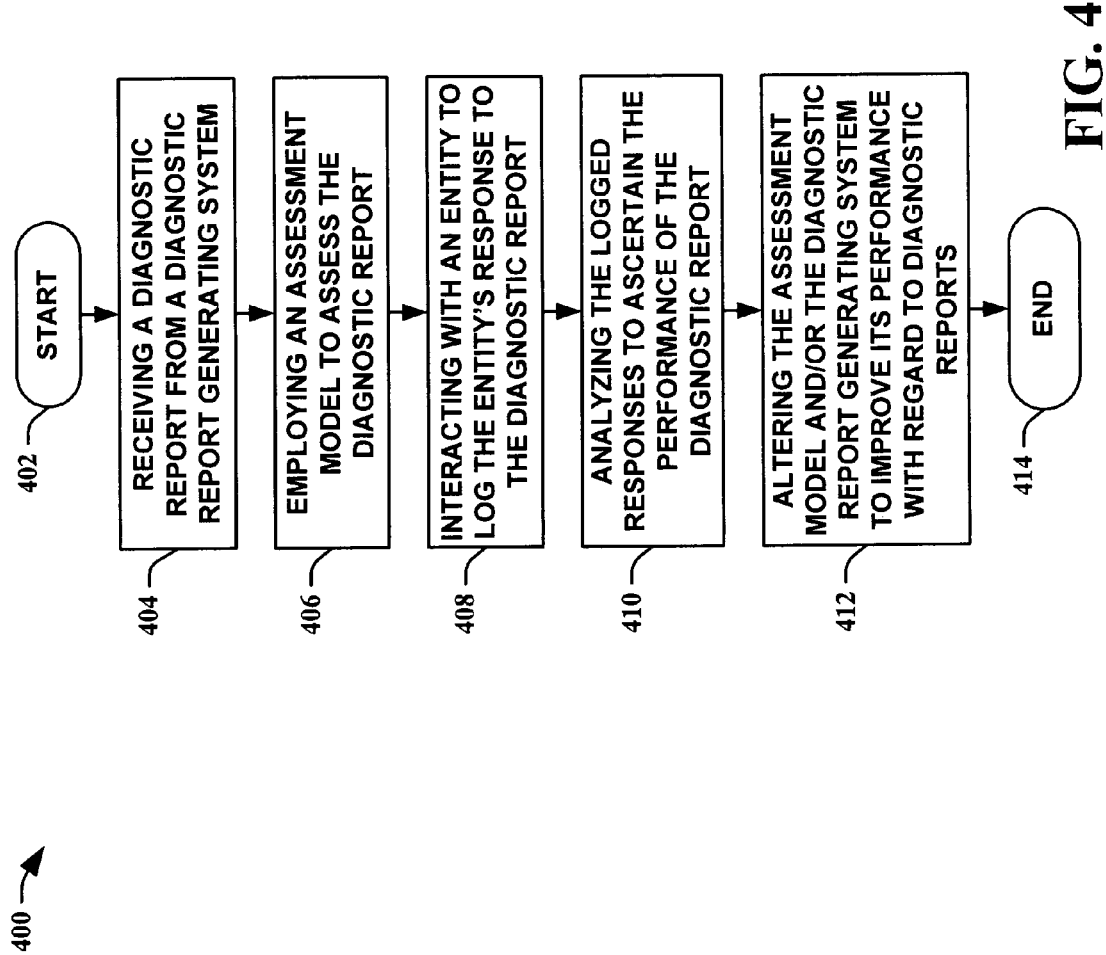
FIG. 4 is a flow diagram of a method of facilitating diagnostic report quality in accordance with an aspect of the subject invention.
Figure 5:
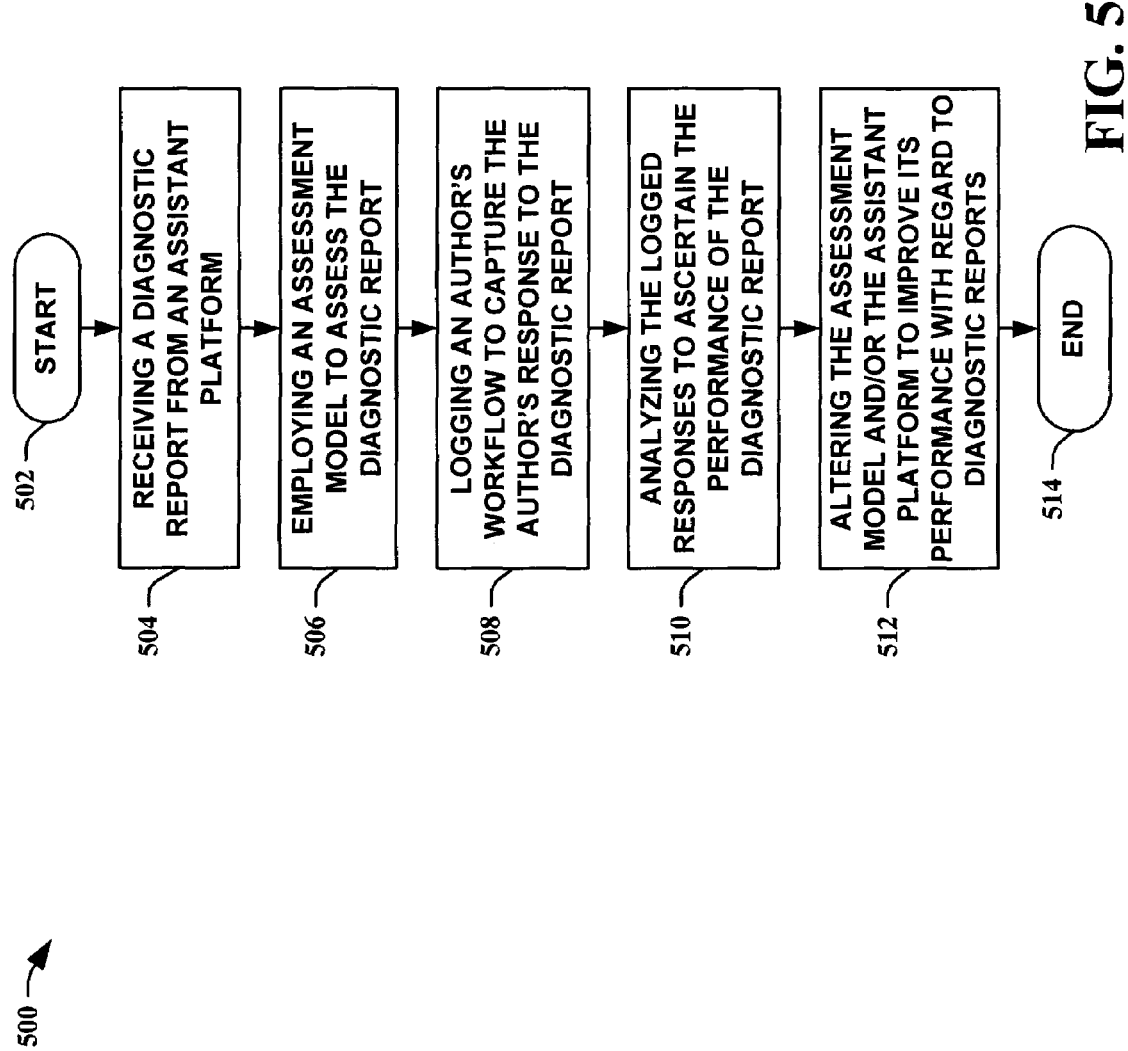
FIG. 5 is another flow diagram of a method of facilitating diagnostic report quality in accordance with an aspect of the subject invention.

In view of the exemplary systems shown and described above, methodologies that may be implemented in accordance with the subject invention will be better appreciated with reference to the flow charts of FIGS. 4-5. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the subject invention.

In FIG. 4, a flow diagram of a method 400 of facilitating diagnostic report quality in accordance with an aspect of the subject invention is shown. The flow 400 starts 402 by receiving a diagnostic report from a diagnostic report generating system 404. The diagnostic report generating system can include, but is not limited to, software product AP systems and/or other assisting mechanisms for other devices and the like. An assessment model 406 is then employed to assess the diagnostic report 406. The assessment model can include, but is not limited to, employing confidence ranking techniques and the like to order the diagnostic reports to increase review efficiency. An entity is then interacted with to facilitate in logging the entity's response to the suggestions of the diagnostic report 408. The logged responses are then analyzed to ascertain the performance of the diagnostic report 410. This generally includes, but is not limited to, the quality of the suggestions from the diagnostic report in relation to the entity's suggestion assessment. The assessment model and/or diagnostic report generating system is then altered to improve its performance with regard to diagnostic reports 412, ending the flow 414. Improving the assessment model increases the efficiency in which an entity can review the diagnostic reports. Improving the diagnostic report generating system improves the quality of the diagnostic reports themselves. Thus, instances of the subject invention substantially enhance the entity's productivity.

Turning to FIG. 5, another flow diagram of a method 500 of facilitating diagnostic report quality in accordance with an aspect of the subject invention is depicted. The method 500 starts 502 by receiving a diagnostic report from an assistant platform (AP) of a software product 504. An assessment model is then employed to assess the diagnostic report 506. The assessment model can include, but is not limited to, ranking the diagnostic report based on confidence levels and the like. This increases the efficiency of an author who reviews the diagnostic report. An author's diagnostic report review workflow is then logged to capture the author's response to the diagnostic report 508. This is typically accomplished in an unobtrusive manner such as, for example, by extracting the author's responses via a background process. The logged responses are then analyzed to ascertain the performance of the diagnostic report 510. This generally includes, but is not limited to, the quality of the suggestions from the diagnostic report in relation to the entity's suggestion assessment. The assessment model and/or assistant platform is then altered to improve its performance with regard to diagnostic reporting and/or end users' satisfaction 512, ending the flow 514. Improving the assessment model increases the efficiency in which an entity can review the diagnostic reports. Improving the diagnostic report generating system improves the quality of the diagnostic reports themselves. Thus, instances of the subject invention substantially enhance the entity's productivity.

Figure 6:
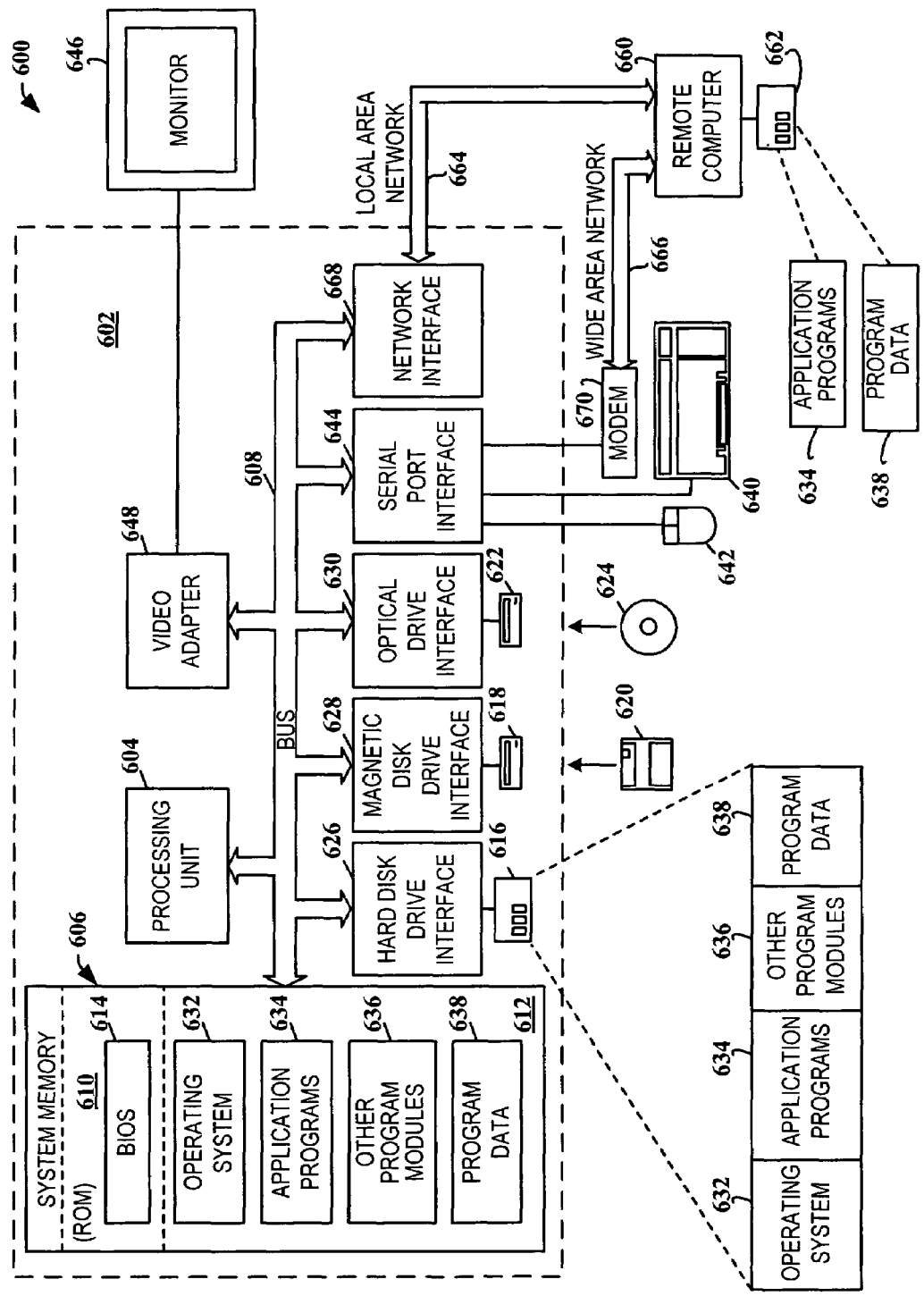
FIG. 6 illustrates an example operating environment in which the subject invention can function.

In order to provide additional context for implementing various aspects of the subject invention, FIG. 6 and the following discussion is intended to provide a brief, general description of a suitable computing environment 600 in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 6, an exemplary system environment 600 for implementing the various aspects of the invention includes a conventional computer 602, including a processing unit 604, a system memory 606, and a system bus 608 that couples various system components, including the system memory, to the processing unit 604. The processing unit 604 may be any commercially available or proprietary processor. In addition, the processing unit may be implemented as multi-processor formed of more than one processor, such as may be connected in parallel.

The system bus 608 may be any of several types of bus structure including a memory bus or memory controller, a peripheral bus, and a local bus using any of a variety of conventional bus architectures such as PCI, VESA, Microchannel, ISA, and EISA, to name a few. The system memory 606 includes read only memory (ROM) 610 and random access memory (RAM) 612. A basic input/output system (BIOS) 614, containing the basic routines that help to transfer information between elements within the computer 602, such as during start-up, is stored in ROM 610.

The computer 602 also may include, for example, a hard disk drive 616, a magnetic disk drive 618, e.g., to read from or write to a removable disk 620, and an optical disk drive 622, e.g., for reading from or writing to a CD-ROM disk 624 or other optical media. The hard disk drive 616, magnetic disk drive 618, and optical disk drive 622 are connected to the system bus 608 by a hard disk drive interface 626, a magnetic disk drive interface 628, and an optical drive interface 630, respectively. The drives 616-622 and their associated computer-readable media provide nonvolatile storage of data, data structures, computer-executable instructions, etc. for the computer 602. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 600, and further that any such media may contain computer-executable instructions for performing the methods of the subject invention.

A number of program modules may be stored in the drives 616-622 and RAM 612, including an operating system 632, one or more application programs 634, other program modules 636, and program data 638. The operating system 632 may be any suitable operating system or combination of operating systems. By way of example, the application programs 634 and program modules 636 can include a diagnostic report improvement scheme in accordance with an aspect of the subject invention.

A user can enter commands and information into the computer 602 through one or more user input devices, such as a keyboard 640 and a pointing device (e.g., a mouse 642). Other input devices (not shown) may include a microphone, a joystick, a game pad, a satellite dish, a wireless remote, a scanner, or the like. These and other input devices are often connected to the processing unit 604 through a serial port interface 644 that is coupled to the system bus 608, but may be connected by other interfaces, such as a parallel port, a game port or a universal serial bus (USB). A monitor 646 or other type of display device is also connected to the system bus 608 via an interface, such as a video adapter 648. In addition to the monitor 646, the computer 602 may include other peripheral output devices (not shown), such as speakers, printers, etc.

It is to be appreciated that the computer 602 can operate in a networked environment using logical connections to one or more remote computers 660. The remote computer 660 may be a workstation, a server computer, a router, a peer device or other common network node, and typically includes many or all of the elements described relative to the computer 602, although for purposes of brevity, only a memory storage device 662 is illustrated in FIG. 6. The logical connections depicted in FIG. 6 can include a local area network (LAN) 664 and a wide area network (WAN) 666. Such networking environments are commonplace in offices, enterprise-wide computer networks, intranets and the Internet.

When used in a LAN networking environment, for example, the computer 602 is connected to the local network 664 through a network interface or adapter 668. When used in a WAN networking environment, the computer 602 typically includes a modem (e.g., telephone, DSL, cable, etc.) 670, or is connected to a communications server on the LAN, or has other means for establishing communications over the WAN 666, such as the Internet. The modem 670, which can be internal or external relative to the computer 602, is connected to the system bus 608 via the serial port interface 644. In a networked environment, program modules (including application programs 634) and/or program data 638 can be stored in the remote memory storage device 662. It will be appreciated that the network connections shown are exemplary and other means (e.g., wired or wireless) of establishing a communications link between the computers 602 and 660 can be used when carrying out an aspect of the subject invention.

In accordance with the practices of persons skilled in the art of computer programming, the subject invention has been described with reference to acts and symbolic representations of operations that are performed by a computer, such as the computer 602 or remote computer 660, unless otherwise indicated. Such acts and operations are sometimes referred to as being computer-executed. It will be appreciated that the acts and symbolically represented operations include the manipulation by the processing unit 604 of electrical signals representing data bits which causes a resulting transformation or reduction of the electrical signal representation, and the maintenance of data bits at memory locations in the memory system (including the system memory 606, hard drive 616, floppy disks 620, CD-ROM 624, and remote memory 662) to thereby reconfigure or otherwise alter the computer system's operation, as well as other processing of signals. The memory locations where such data bits are maintained are physical locations that have particular electrical, magnetic, or optical properties corresponding to the data bits.

Figure 7:
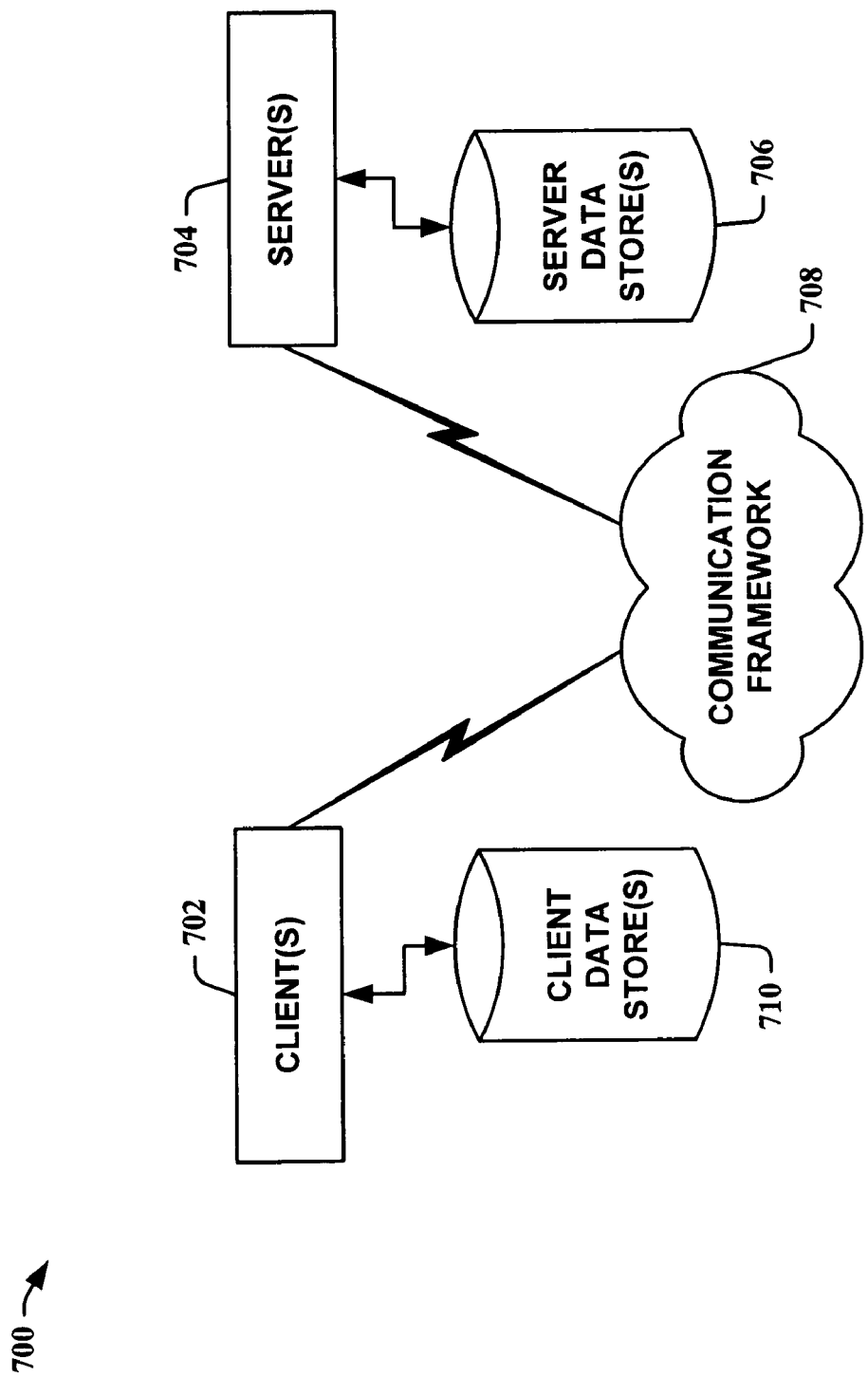
FIG. 7 illustrates another example operating environment in which the subject invention can function.

FIG. 7 is another block diagram of a sample computing environment 700 with which the subject invention can interact. The system 700 further illustrates a system that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). One possible communication between a client 702 and a server 704 may be in the form of a data packet adapted to be transmitted between two or more computer processes. The system 700 includes a communication framework 708 that can be employed to facilitate communications between the client(s) 702 and the server(s) 704. The client(s) 702 are connected to one or more client data store(s) 710 that can be employed to store information local to the client(s) 702. Similarly, the server(s) 704 are connected to one or more server data store(s) 706 that can be employed to store information local to the server(s) 704.

It is to be appreciated that the systems and/or methods of the subject invention can be utilized in diagnostic report improvement facilitating computer components and non-computer related components alike. Further, those skilled in the art will recognize that the systems and/or methods of the subject invention are employable in a vast array of electronic related technologies, including, but not limited to, computers, servers and/or handheld electronic devices, and the like.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that utilizes data mining, comprising:
    at least one processor that executes the following computer executable components stored on at least one computer readable storage medium:
        an assessment model component that receives at least one diagnostic report from a diagnostic report generating system and generates a quality assessment of each report for an entity, wherein the diagnostic report generating system generates the at least one diagnostic report and wherein the at least one diagnostic report is associated with an analysis of a query by a disparate entity and comprises suggestions associated with the query;
        a logging component that creates a quality data log in response to entity's action with regard to the utilization of each suggestion in each of the diagnostic reports; and
        an analysis component that determines the quality of the at least one diagnostic report based in part on an analysis of the quality data log to facilitate in improving the at least one diagnostic report and the quality assessment by the assessment model component, wherein the analysis component improves an analysis mechanism of an assistant platform (AP), wherein the diagnostic reports and the each suggestion are sorted based on the analysis so that the entity can work on high quality suggestions first, wherein the analysis component determines improvements for the assessment model component via analysis of, at least in part, situations which provide suggestions that are not utilized by the entity, wherein the analysis component determines improvements for the assessment model component via analysis of, at least in part, situations which provide suggestions that are accepted by the entity, and wherein the analysis component utilizes machine learning techniques to facilitate in improving at least one of the assessment model component and the diagnostic report generating system.

2. The system of claim 1, the entity comprising an author associated with a software product.

3. The system of claim 1, wherein the assessment model component employs a highest to lowest confidence sorting technique.

4. The system of claim 1, the logging component comprising a workflow logging component that logs a software product author's responses.

5. The system of claim 1, wherein the logging component logs a suggestion in a diagnostic report as useful when the entity takes an action suggested by the suggestion.

6. The system of claim 1, wherein the system is employed to improve the entity's performance.

7. The system of claim 1, wherein the system operates non-intrusively with regard to the entity.

8. A method of utilizing data mining, comprising:
    employing at least one processor to execute computer executable instructions stored on at least one computer readable storage medium to perform the following acts:
        receiving at least one diagnostic report containing suggestions from a diagnostic report generating system, wherein the diagnostic report generating system generates the at least one diagnostic report and wherein the at least one diagnostic report is associated with an analysis of a query by a user and comprises suggestions associated with the query;
        employing an assessment model to assess a value of the at least one diagnostic report;
        interacting with an entity to facilitate unobtrusively logging the entity's response associated with a review of the at least one diagnostic report, wherein the entity is disparate from the user;
        analyzing the logged responses to improve the performance of the assessment model;
        sorting disparate diagnostic reports and suggestions received from the diagnostic report generating system based in part on the analysis to provide the entity with high quality suggestions first; and
        altering the assessment model and the diagnostic report generating system based upon the analysis to facilitate improving its performance with regard to diagnostic reporting by improving at least one of generation of the at least one diagnostic report and assessment of the improved at least one diagnostic report based on the analysis;
        logging a suggestion in the diagnostic report as not useful when the entity rejects an action suggested by the suggestion; and employing machine learning techniques to facilitate in improving performance of at least one of the assessment model and the diagnostic report generating system.

9. The method of claim 8, the entity comprising an author associated with a software product.

10. The method of claim 8, the diagnostic report generating system comprising an assistant platform.

11. The method of claim 8, wherein the method is employed to improve an entity's performance.

12. The method of claim 8, wherein the assessment model utilizes a highest to lowest confidence sorting technique.

13. The method of claim 8, wherein the method process unobtrusively with regard to the entity.

14. The method of claim 8 further comprising:
logging a suggestion in a diagnostic report as useful when the entity takes an action suggested by the suggestion.

15. A system that utilizes data mining, comprising:
at least one processor;
at least one computer readable storage medium storing computer executable instructions that when executed by the at least one processor implement components comprising:
means for receiving at least one diagnostic report from a diagnostic report generating system, wherein the diagnostic report generating system generates the at least one diagnostic report and wherein the at least one diagnostic report is associated with an analysis of a query by a user and includes suggestions associated with the query;
means for generating a quality assessment of each diagnostic report for an entity, wherein the entity disparate is from the user;
means for creating a quality data log in response to the entity's action with regard to the utilization of each of the diagnostic reports;
means for sorting the at least one diagnostic report and suggestions contained in the at least one diagnostic report based in part on an analysis of the quality data log to provide the entity with a highest quality suggestion first; and
means for employing the quality data log to facilitate in improving at least one of the quality assessment and the diagnostic report generating system by improving generation of the at least one diagnostic report and assessment of the improved at least one diagnostic report based on the analysis, wherein means for employing the quality data log determines improvements for the means for generating a quality assessment via analysis of, at least in part, situations which provide suggestions that are not utilized by the entity, wherein the means for employing the quality data log determines improvements for the means for generating a quality assessment via analysis of, at least in part, situations which provide suggestions that are accepted by the entity, and wherein the means for employing the quality data log utilizes machine learning techniques to facilitate in improving at least one of the means for generating a quality assessment and the diagnostic report generating system.

16. The system of claim 15, wherein the entity comprises an author associated with a software product.

17. The system of claim 15, wherein the means for sorting employs a highest to lowest confidence sorting technique.

18. The system of claim 15, wherein the system is employed to improve the entity's performance.

19. The system of claim 15, wherein the system operates non-intrusively with regard to the entity.

20. The system of claim 15, wherein the diagnostic report generating system comprises an assistant platform.

\* \* \* \* \*